United States Patent
Narayana

(10) Patent No.: US 9,269,378 B2
(45) Date of Patent: Feb. 23, 2016

(54) STRAY FIELD SHIELDING FOR PERPENDICULAR MAGNETIC RECORDING WRITE HEAD

(71) Applicant: HGST Netherlands B.V., Amsterdam (NL)

(72) Inventor: Supradeep Narayana, Santa Clara, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/136,830

(22) Filed: Dec. 20, 2013

(65) Prior Publication Data

US 2015/0179192 A1 Jun. 25, 2015

(51) Int. Cl.
G11B 5/127 (2006.01)
G11B 5/11 (2006.01)
G11B 5/31 (2006.01)

(52) U.S. Cl.
CPC ............. G11B 5/11 (2013.01); G11B 5/1278 (2013.01); G11B 5/3116 (2013.01); G11B 5/3146 (2013.01)

(58) Field of Classification Search
USPC ............................................. 360/125.3, 128
See application file for complete search history.

(56) References Cited

U.S. PATENT DOCUMENTS

| | | | |
|---|---|---|---|
| 5,311,387 A * | 5/1994 | Mallary | 360/125.02 |
| 6,728,065 B2 | 4/2004 | Batra et al. | |
| 6,798,615 B1 | 9/2004 | Litvinov et al. | |
| 6,922,317 B2 * | 7/2005 | Kirschenbaum et al. | 360/317 |
| 7,002,775 B2 * | 2/2006 | Hsu et al. | 360/125.03 |
| 7,057,837 B2 | 6/2006 | Gill | |
| 7,394,620 B2 * | 7/2008 | Taguchi | 360/125.03 |
| 7,529,066 B2 * | 5/2009 | Carey et al. | 360/324.11 |
| 7,561,379 B2 * | 7/2009 | Li et al. | 360/125.24 |
| 7,649,711 B2 | 1/2010 | Ho et al. | |
| 7,983,002 B2 * | 7/2011 | Pust et al. | 360/125.04 |
| 8,054,586 B2 | 11/2011 | Balamane et al. | |
| 8,120,874 B2 * | 2/2012 | Hsiao et al. | 360/119.04 |
| 8,149,538 B2 * | 4/2012 | Fuchizaki et al. | 360/125.3 |
| 8,169,741 B2 * | 5/2012 | Taguchi et al. | 360/125.3 |
| 8,233,237 B2 * | 7/2012 | Anagawa et al. | 360/125.3 |
| 8,315,013 B2 | 11/2012 | Biskeborn et al. | |
| 8,339,734 B2 | 12/2012 | Pentek et al. | |
| 8,345,385 B2 * | 1/2013 | Gao et al. | 360/125.3 |
| 8,345,388 B2 | 1/2013 | Guan et al. | |
| 8,649,125 B1 * | 2/2014 | Basu et al. | 360/125.3 |

(Continued)

OTHER PUBLICATIONS

Kiyoshi Yamakawa et al.; "High Writability Head with Robustness Against Stray Field and Narrow-Track Recording Properties"; IEEE Transactions on Magnetics, vol. 38, No. 4. Jul. 2002, 6 pages.

*Primary Examiner* — Brian Miller
(74) *Attorney, Agent, or Firm* — Patterson & Sheridan, LLP

(57) ABSTRACT

The present invention relates to stray magnetic shielding in PMR systems. The stray magnetic fields can funnel through the magnetic write head into the recording medium and lead to degradation in performance, even erasure. By placing a magnetic shield around the return pole, and spaced from the main pole by a nonmagnetic material, the stray magnetic flux is diverted into the additional stray field magnetic shields such that the stray magnetic fields travel mainly through the shield, away from the main pole. This ensures the stray magnetic flux density will be decreased greatly before reaching the recording medium, unable to negatively affect performance. To further ensure ease of manufacturing, the magnetic shield is made from the same material as the main pole, the return pole, or both.

22 Claims, 10 Drawing Sheets

(56) References Cited

U.S. PATENT DOCUMENTS

| | | | |
|---|---|---|---|
| 8,675,307 B2 * | 3/2014 | Gao et al. | 360/125.03 |
| 8,737,022 B2 * | 5/2014 | Kato et al. | 360/319 |
| 8,792,208 B1 * | 7/2014 | Liu et al. | 360/125.03 |
| 8,830,625 B2 * | 9/2014 | Linville et al. | 360/125.3 |
| 8,848,316 B2 * | 9/2014 | Kief et al. | 360/125.3 |
| 8,929,027 B1 * | 1/2015 | Sugiyama et al. | 360/125.01 |
| 2006/0092569 A1 | 5/2006 | Che et al. | |
| 2006/0245108 A1 | 11/2006 | Hsu et al. | |
| 2007/0035885 A1 * | 2/2007 | Im et al. | 360/317 |
| 2010/0061016 A1 * | 3/2010 | Han et al. | 360/125.3 |
| 2012/0281314 A1 | 11/2012 | Lopusnik et al. | |
| 2013/0120876 A1 | 5/2013 | Maeda et al. | |

\* cited by examiner

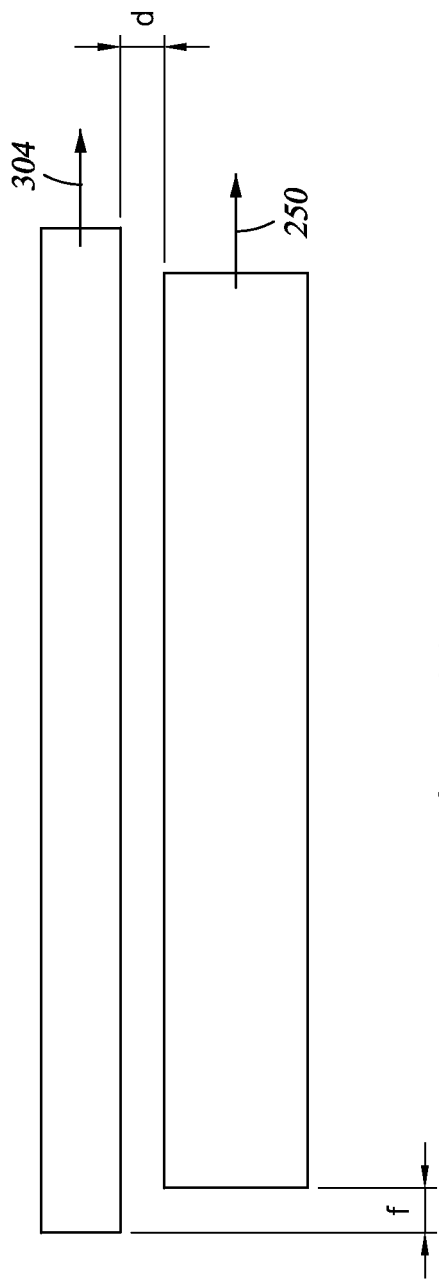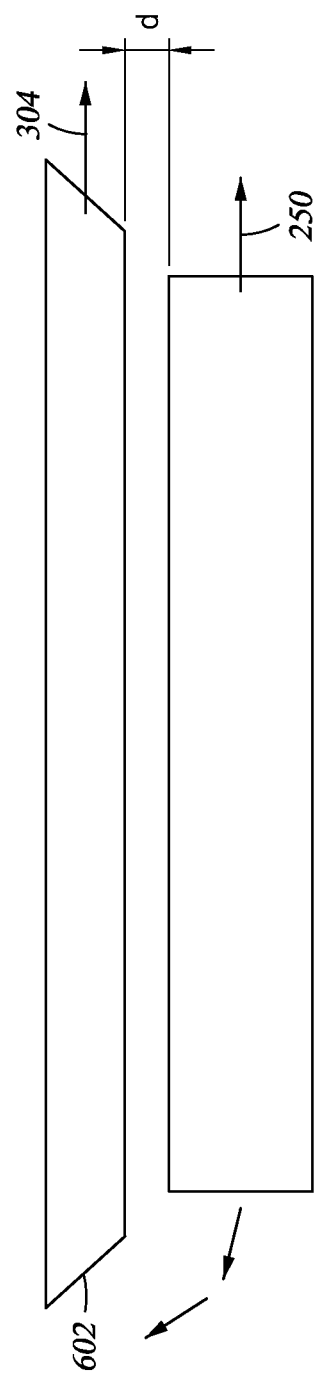
Fig. 6A
Fig. 6B

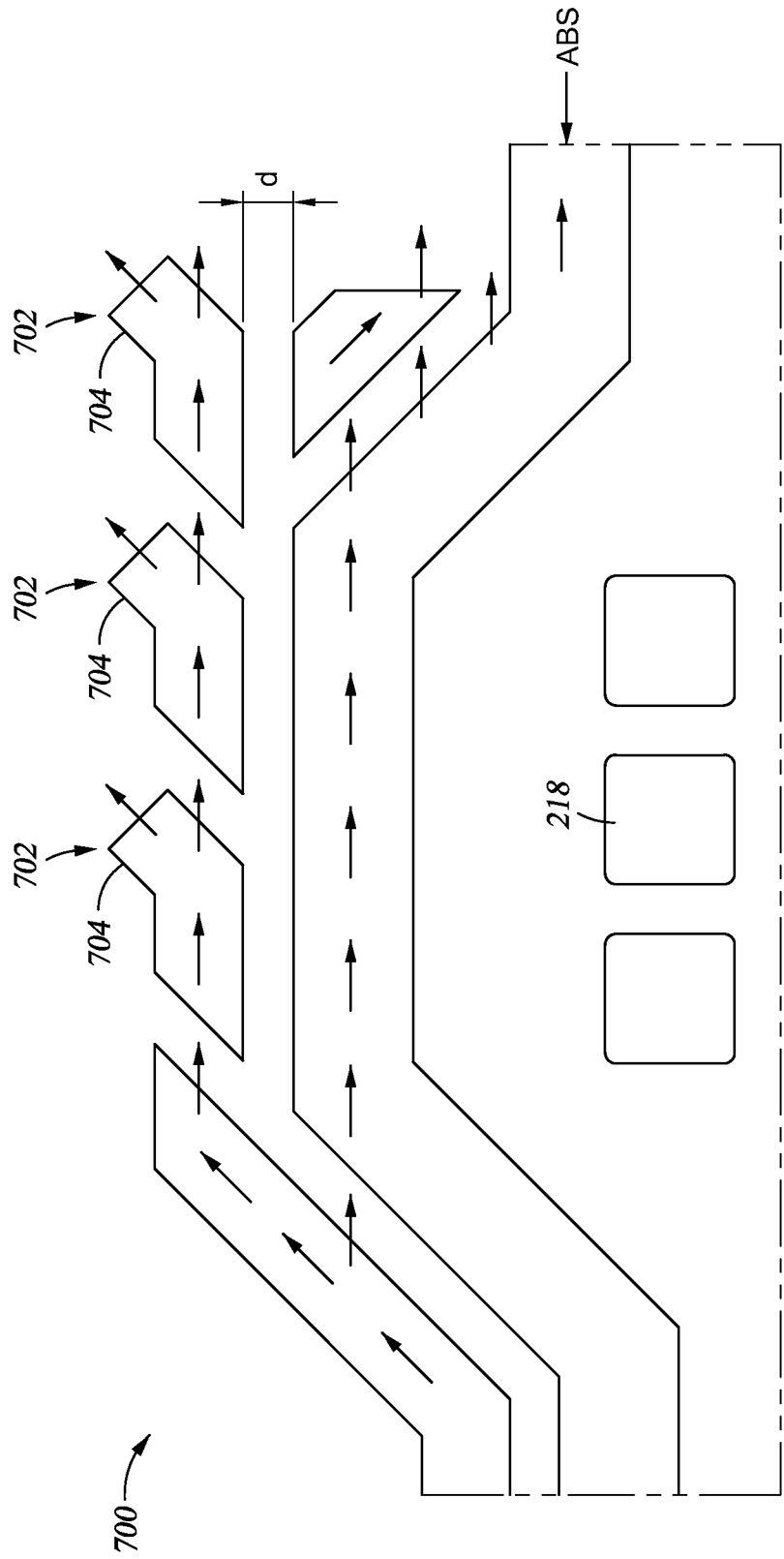

STRAY FIELD SHIELDING FOR PERPENDICULAR MAGNETIC RECORDING WRITE HEAD

BACKGROUND OF THE INVENTION

1. Field of the Invention

Embodiments of the present invention generally relate to a perpendicular magnetic recording (PMR) write head.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider towards the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In order for the magnetic disk drive to function properly, the disk drive must be able to function even in the presence of high external stray magnetic fields. The stray magnetic fields can impact both write and read operations. One solution is to widen the return pole at the ABS, or to widen the wrap around shield at the ABS to decrease the flux density due to stray magnetic field at ABS. Additionally, larger return poles and increasing the size of the wrap around only mitigate the effect of stray magnetic fields but do not eliminate them in the presence at high stray magnetic field. Additionally, if the yoke and/or return pole are too small, then the stray magnetic fields could alter the saturation rate of the return pole/yoke and thus, shift the optimum point of operation for the write head.

Therefore, there is a need in the art for preventing stray magnetic fields from interfering with write heads without reducing performance capabilities of the write head. Additionally, this protection should be implemented with a process that is compatible to with the existing fabrication process.

SUMMARY OF THE INVENTION

The present invention relates to stray magnetic shielding in PMR systems. The stray magnetic fields can funnel through the magnetic write head into the recording medium and lead to degradation in performance, even erasure. By placing a magnetic shield around the return pole, and spaced from the main pole by a nonmagnetic material, the stray magnetic flux is diverted into the additional stray field magnetic shields such that the stray magnetic fields travel mainly through the shield, away from the main pole. This ensures the stray magnetic flux density will be decreased greatly before reaching the recording medium, unable to negatively affect performance. To further ensure ease of manufacturing, the magnetic shield is made from the same material as the main pole, the return pole, or both In another embodiment, a write head for a magnetic recording head comprises a return pole comprising a magnetic material; a nonmagnetic material disposed on the return pole; and a shield disposed on the nonmagnetic material and at least partially surrounding the return pole, wherein the shield comprises magnetic material.

In one embodiment, a write head for a magnetic recording head comprises a main pole comprising a magnetic material; a first nonmagnetic material at least partially surrounding the main pole; a coil disposed in the first nonmagnetic material; a return pole disposed at least partially around the first nonmagnetic material; a second nonmagnetic material at least partially surrounding the return pole; and a shield at least partially surrounding the second nonmagnetic material, wherein the shield comprises magnetic material.

In another embodiment, a write head for a magnetic recording head comprises a main pole comprising a magnetic material, the main pole having a first end that comprises at least a portion of an air bearing surface; a nonmagnetic material coupled to the main pole at a second end of the main pole that is opposite the first end; and a shield coupled to the nonmagnetic material such that the nonmagnetic material is disposed between the shield and the main pole.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A and 6B show ABS views of the magnetic shield and return pole.

FIGS. 7-9 are a schematic cross-sectional illustration of the side shields of a write head according to other embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention relates to stray magnetic shielding in PMR systems. The stray magnetic fields can funnel through the magnetic write head into the recording medium and lead to degradation in performance, even erasure. By placing a magnetic shield around the return pole, and spaced from the main pole by a nonmagnetic material, the stray magnetic flux is diverted into the additional stray field magnetic shields such that the stray magnetic fields travel mainly through the shield, away from the main pole. This ensures the stray magnetic flux density will be decreased greatly before reaching the recording medium, unable to negatively affect performance. To further ensure ease of manufacturing, the magnetic shield is made from the same material as the main pole, the return pole, or both.

Figure 1:
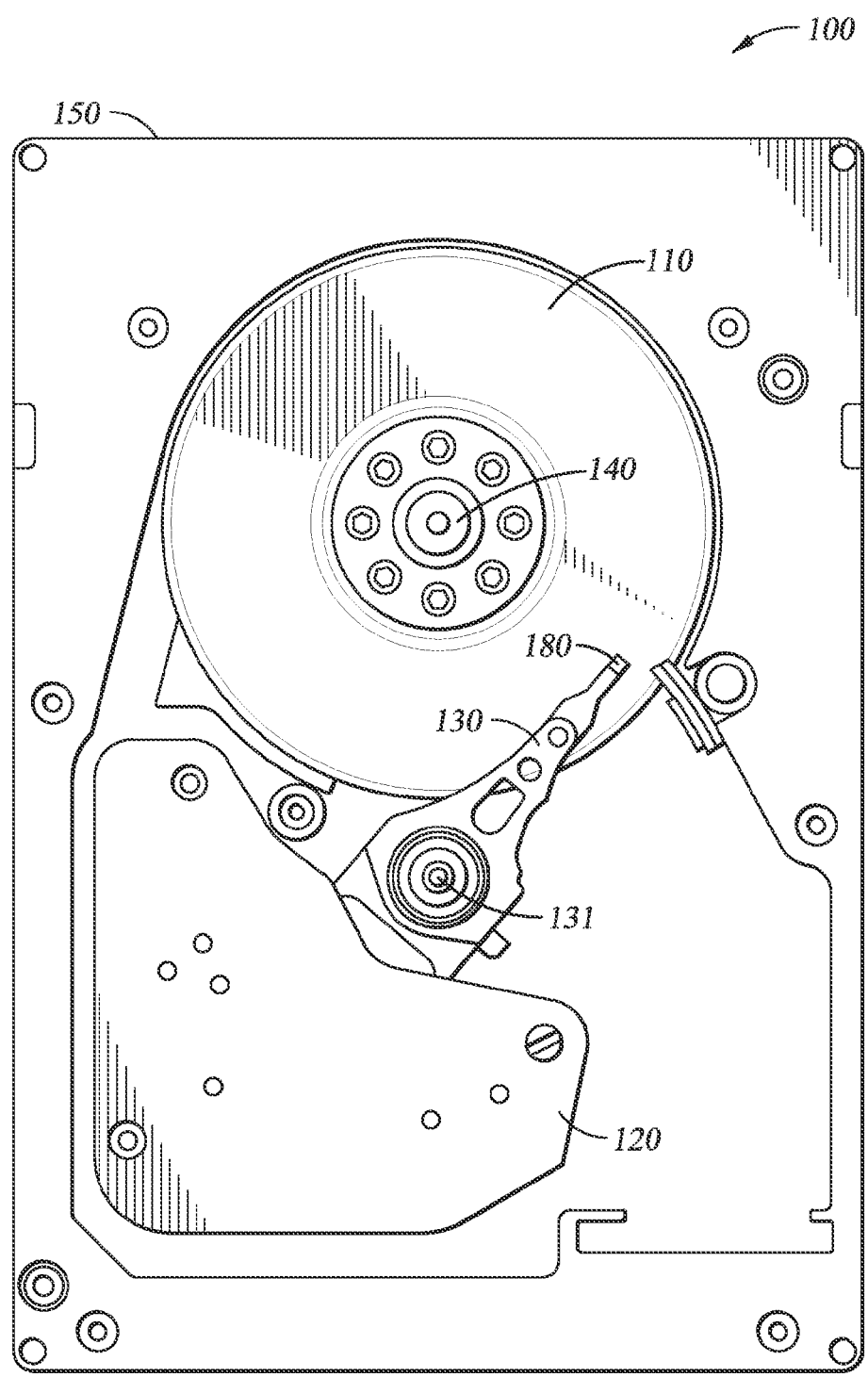
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks 110 may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
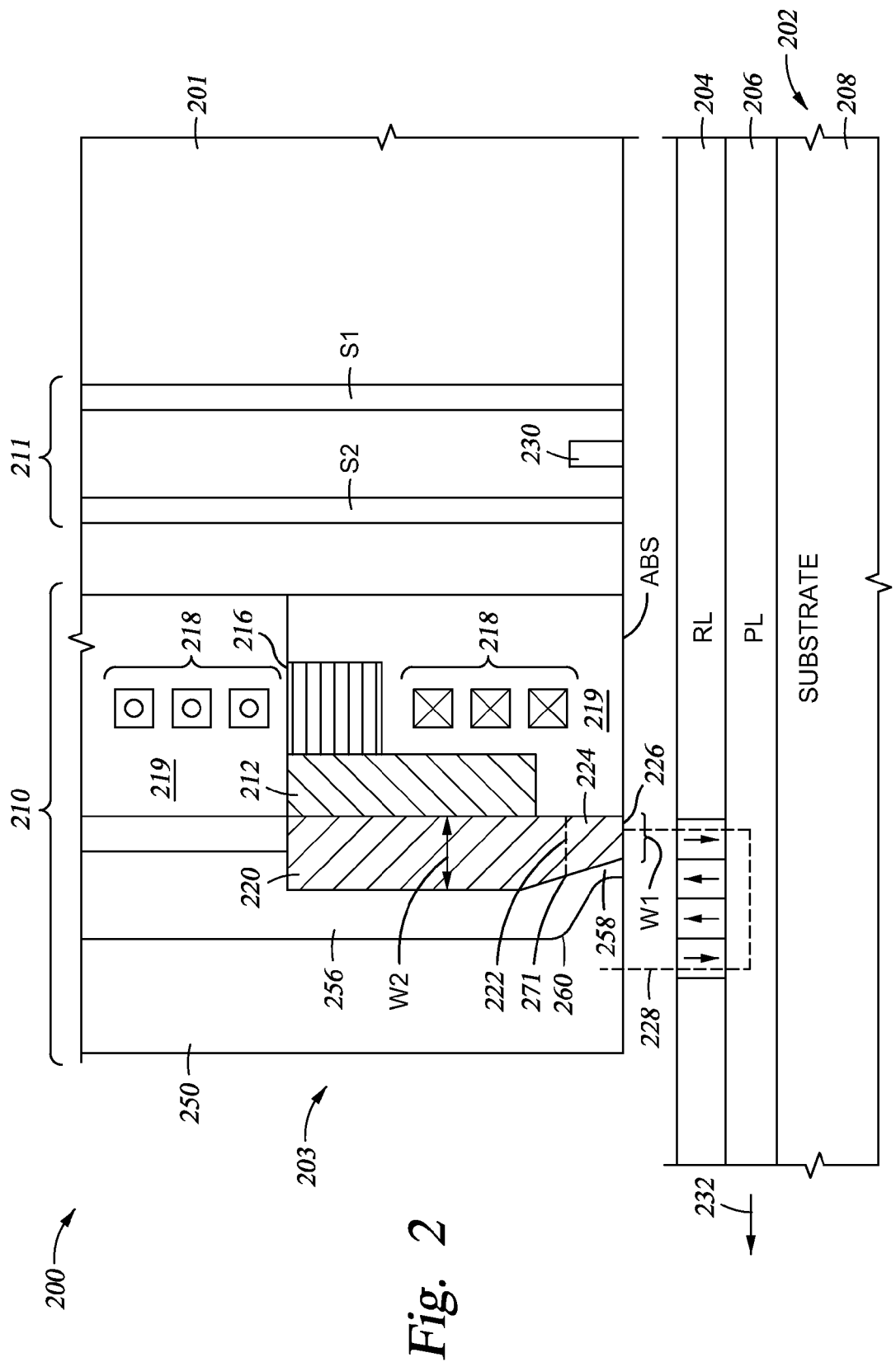
FIG. 2 is a side view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that its ABS is facing the magnetic disk 202. In FIG. 2, the disk 202 moves past the write head 210 in the direction indicated by the arrow 232, so the portion of slider 201 that supports the read/write head 200 is often called the slider "trailing" end 203. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an return pole 250. In one embodiment, the greater the magnetic flux of the write pole 220, the greater is the probability of accurately writing to desirable regions of the RL 204.

FIG. 2 further illustrates one embodiment of the return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments. In some embodiments the return pole could be two arms, instead of one, each on either side of the main pole.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper 260 may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 3:
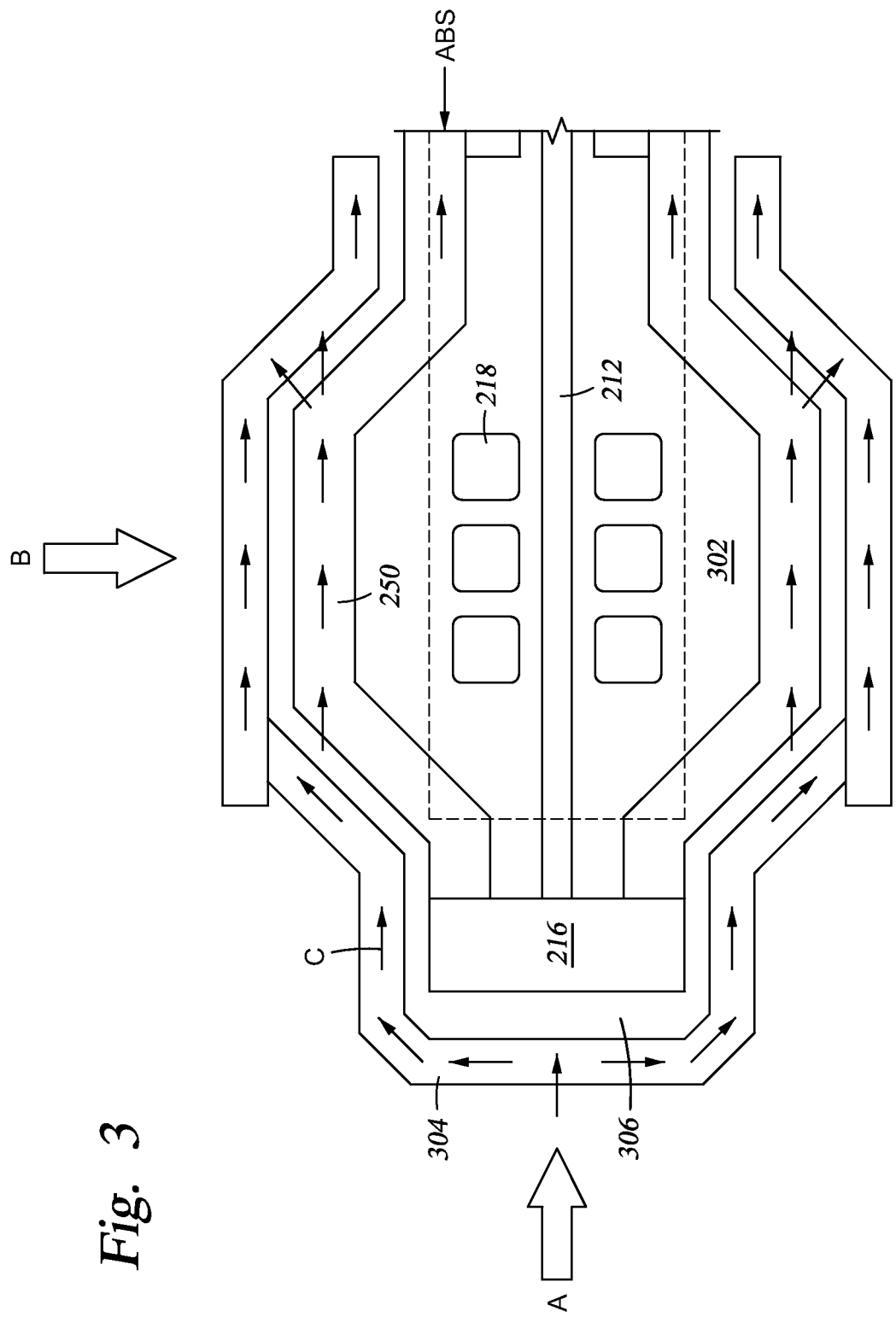
FIG. 3 is a schematic cross-sectional view of a write head according to one embodiment.

FIG. 3 is a schematic cross-sectional view of a write head 300 according to one embodiment. The write head 300 includes a main pole 212 with the coil 218 wrapped therearound. As discussed above, the main pole 212 should be protected from stray magnetic fields to prevent tunneling of the stray magnetic field through the main pole 212 to the magnetic disk 202. The main pole 212 is surrounded by a first non-magnetic material 302 which in turn is surrounded by the return pole 250. The first non-magnetic material 302 may comprise alumina. The magnetic yoke 216 is disposed at an end of the main pole 212 that is opposite the ABS. The magnetic yoke 216 is coupled to both the main pole 212 and the return pole 250. The magnetic yoke 216, main pole 212 and return pole 250 may all comprise the same material.

The stray magnetic field can enter the write pole parallel to the main pole 212, as shown by arrow "A" or perpendicular to the main pole 212, as shown by arrow "B". The stray magnetic field can enter the yoke 216 or the return pole 250 and thus, reach the main pole 212 and negatively impact the write head 300. The magnetic shield 304 surrounds the return pole 250. The magnetic shield 304 is spaced from the return pole 250 and yoke 216 by a second nonmagnetic layer 306. The second nonmagnetic layer 306 may comprise alumina. The second nonmagnetic layer 306 provides separation to prevent the stray magnetic field from entering the main pole 212 through the yoke 216. Due to the presence of the second nonmagnetic layer 306, the main pole 212 is isolated from the magnetic shield 304. Therefore, the stray magnetic field traveling through the magnetic shield 304 (shown by arrows "C") does not reach the yoke 216 or main pole 212. The stray magnetic field can, however, flow into the return pole 250 depending upon the thickness of the second nonmagnetic layer 306. As such, the magnetic shield 304 can function can be twofold one as an additional return pole by shunting flux from the return pole 250 to assist recording and secondly if the stray field is high or magnetic shield is small some of the stray field load can be shared by the return pole 250. In the embodiment shown in FIG. 3, the magnetic shield 304 may comprise multiple pieces. The magnetic shield 304 may comprise the same magnetic material as the return pole 250, the yoke 216 and/or the main pole 212.

Figure 4:
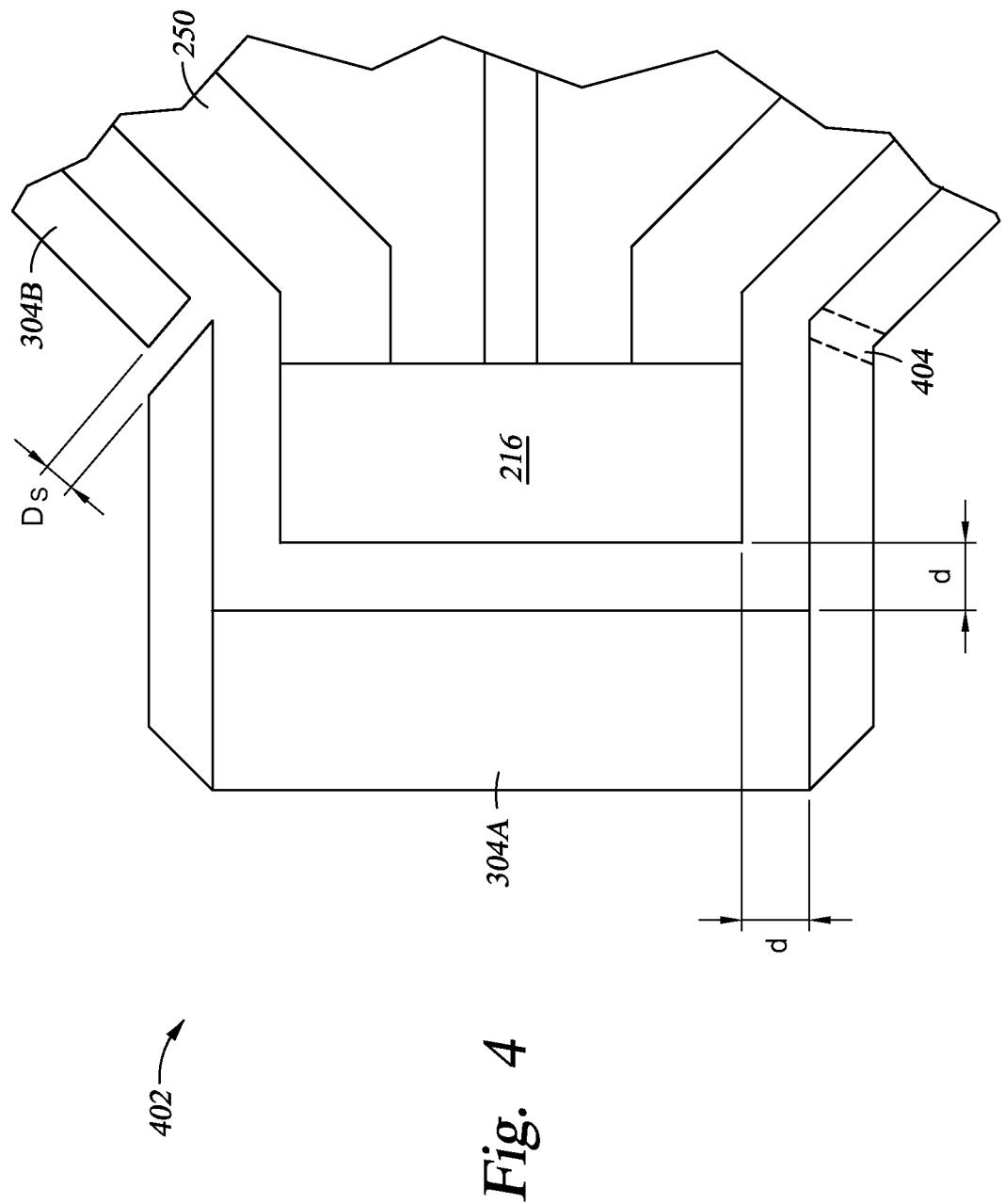
FIG. 4 is a partial schematic illustration of the back end of a write head.

FIG. 4 is a partial schematic illustration of the back end 402 of a write head. The magnetic shield 304 is spaced from the yoke 216 and return pole 250 by a distance shown by arrows "d". If the magnetic shield 304 comprises multiple pieces, namely a back end shield 304A (i.e. head cap) and a side shield 304B, then the shields 304A, 304B are spaced apart by a gap 404 that may be filled with nonmagnetic material such as alumina. The gap 404 has a width shown by arrows "ds" such that the width of the gap 404 is less than the distance "d". Because the distance "d" is greater than the width "ds", the stray magnetic field will be less likely to 'jump' to the yoke 216 and the return pole 250. In other words, the stray magnetic field will find the magnetic reluctance greater towards the back end rather than the shield 304 and thus, the stray magnetic field will not travel through the main pole 212.

It should be noted that the distance "d" between the shield 304 and the yoke 216 or return pole 250 should be chosen such that it does not shift the operating point of the write head.

Figure 5A:
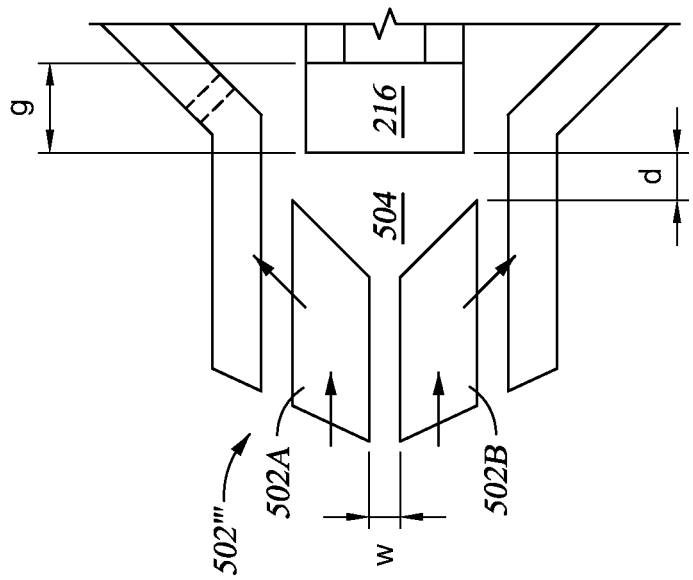
FIGS. 5A-5D are schematic cross-sectional illustrations of the back end shield of the write head according to various embodiments.
Figure 5B:
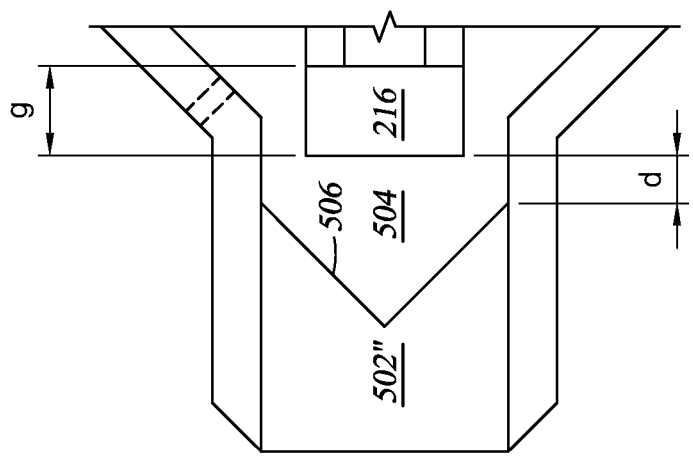
Figure 5C:
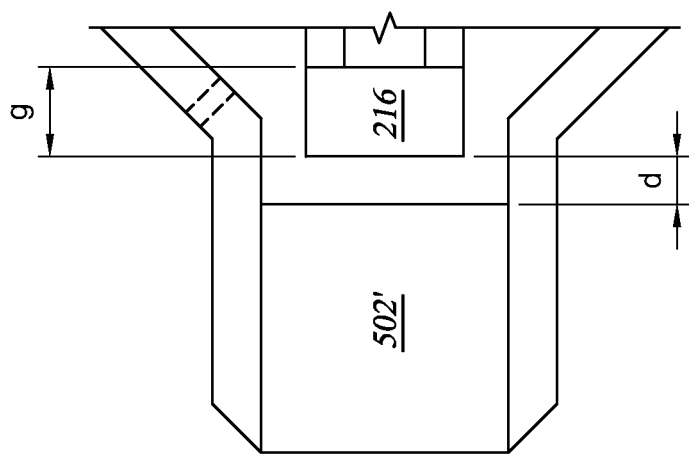
Figure 5D:
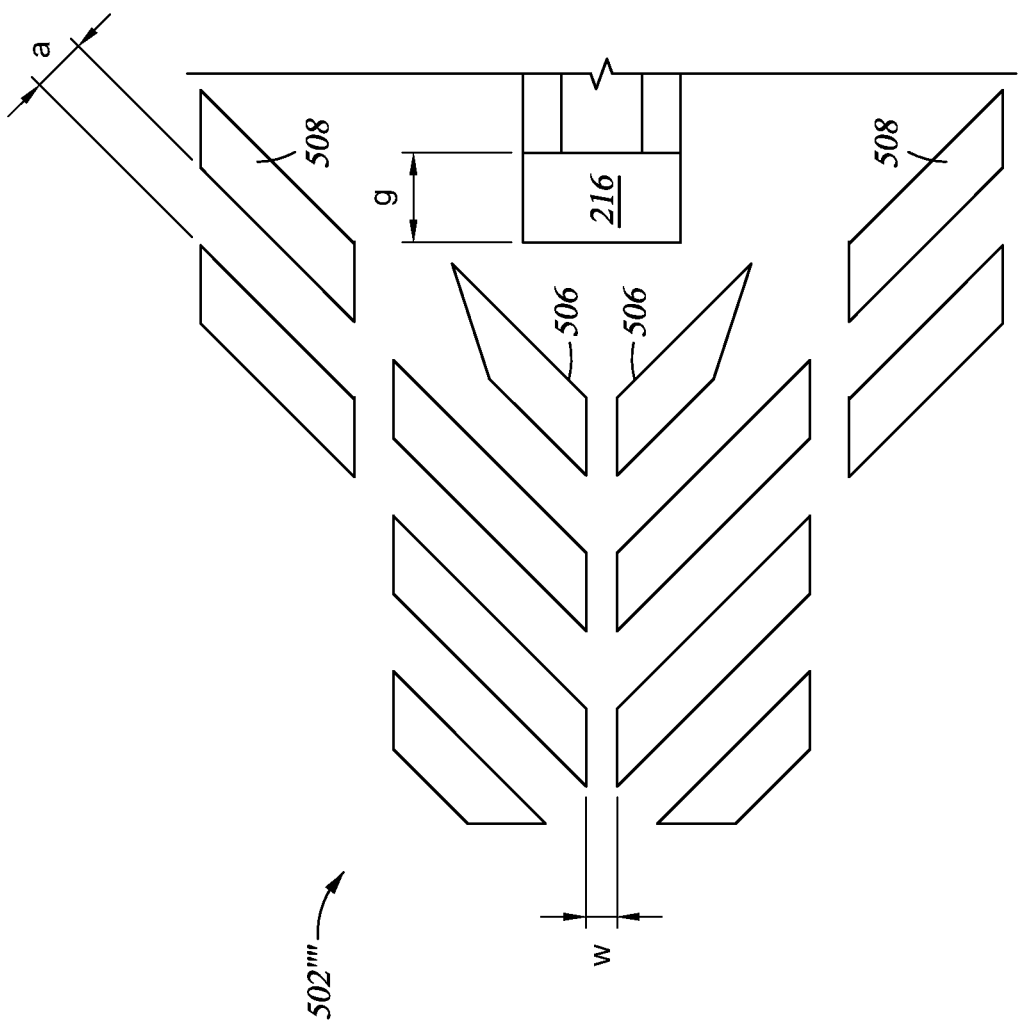

FIGS. 5A-5D are schematic cross-sectional illustrations of the back end 402 of the write head according to various embodiments and in particular, four different head caps 502', 502", 502"', 502"" or back end shields. As shown in FIGS. 5A-5D, the shield 304 at the back end 402 can have different shapes to guide the stray magnetic field away from the yoke 216. In each of FIGS. 5A-5D, the magnetic yoke 216 has a width "g" and the magnetic shield 304 is spaced from the magnetic yoke by a distance "d". The head cap 502', 502", 502"', 502"" of the magnetic shield 304 may have different shapes to direct the stray magnetic fields. As shown in FIG. 5A, the head cap 502' can have a substantially rectangular shape and thus, be spaced from the yoke 216 by the distance "d". However, as shown in FIGS. 5B-5D, the head cap 502", 502"', 502"" can have additional spacing 504 between the head cap 502", 502"', 502"" and the yoke 216.

As shown in FIG. 5B, the head cap 502" can have a concave face 506 facing the yoke 216. The concave face 506, together with the increased distance represented by spacing 504 and distance "d" collectively, directs the stray magnetic field to pass along the magnetic shield 304 and not penetrate to the magnetic yoke 216. In the embodiment shown in FIG. 5C, the head cap 502"' can be split into two slabs 502A, 502B that are spaced apart by a distance "w" that is less than distance "d". The two slabs 502A, 502B can be spaced apart by nonmagnetic material such as alumina. As shown in FIG. 5D, the head cap 502"" can have multiple slabs 508 that are each spaced apart by a distance "a" that is small enough for the magnetic flux to spread, but not large enough so that the magnetic flux would filter to the yoke 216. The slabs 508 provide a more gradual path for the magnetic flux to be diverted and reduce the density of the stray magnetic field at every slab 508. By using the slabs to implement the shield such as in 5C and 5D, the magnetic volume of the shield is reduced so coupling of that shield to the main write head is further reduced but much of the stray fielding capability is retained.

FIGS. 6A and 6B show ABS views of the magnetic shield 304 and return pole 250. As shown in FIG. 6A, the shield 304 may extend longitudinally beyond the return pole 250 by a distance "f" in each direction. However, as shown in FIG. 6B, the side surface 602 of the magnetic shield 304 may have a sloped surface to increase the surface area and thus, increase the shunting ability of the magnetic shield 304.

FIG. 7 is a schematic cross-sectional illustration of a write head 700 according to another embodiment illustrating the side shield 702 according to one embodiment. A single, solid piece side shield 304B is shown in FIG. 4. In FIG. 7, the side shield 702 comprises several pieces with each piece having a flare portion 704. The flare portions 704 direct the stray magnetic field out through the flare portion 704 and thus, away from the write head 700.

Figure 8:
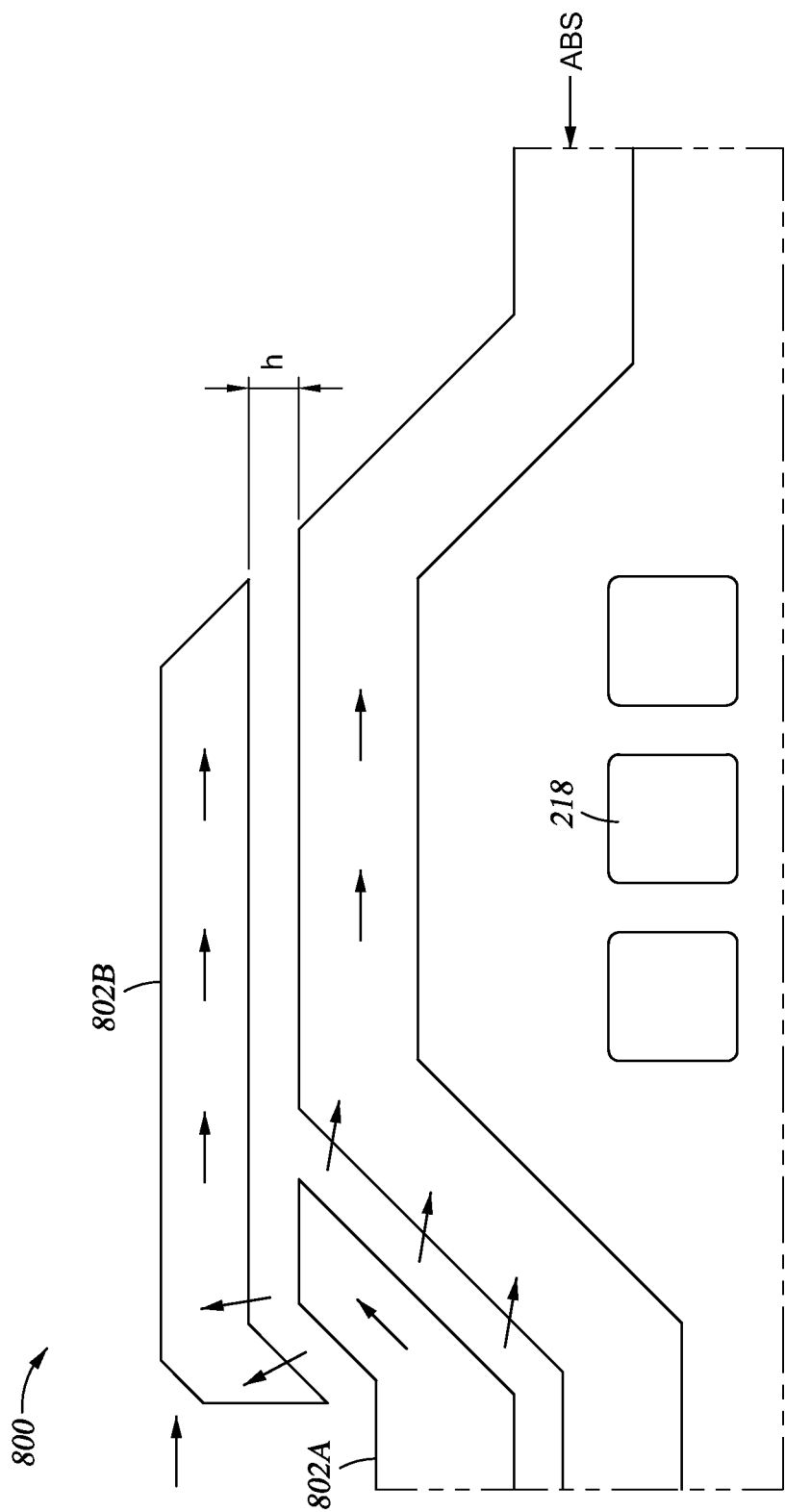

FIG. 8 is a schematic cross-sectional illustration of a write head 800 according to another embodiment illustrating the side shield 802B according to another embodiment. The return pole 250 at the ABS is longer in the cross-track direction. As such, the shield 304 is recessed from the ABS. Additionally, the side shield 802B overlaps with the head cap 802A (or back end shield). The overlapping, together with recess from the ABS, compensate for the larger wrap around shield at the ABS.

Figure 9:
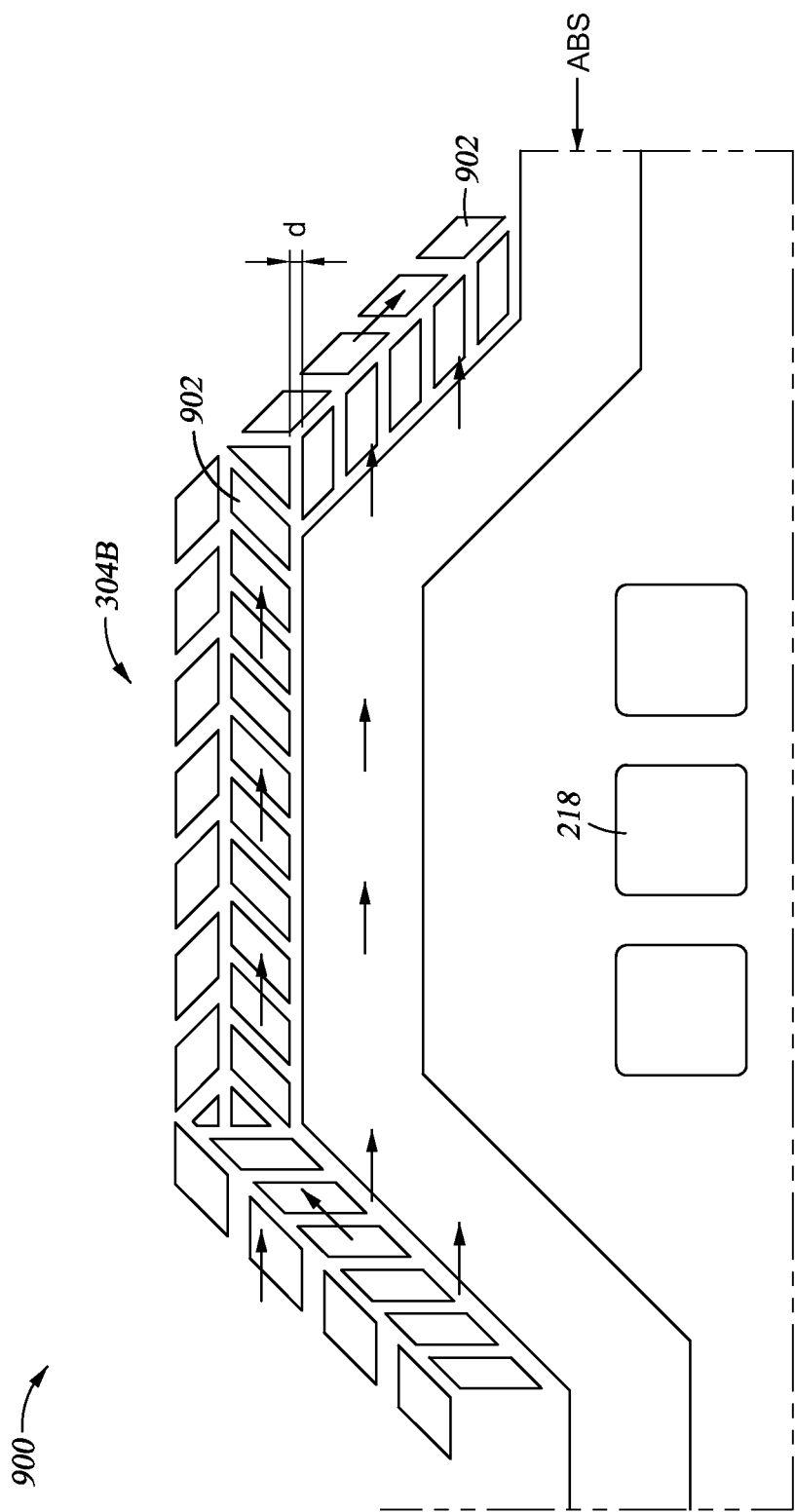

Similar to FIG. 5D, FIG. 9 is a cross-sectional illustration of the write head 900 where the side shield 304B comprises a plurality of slabs 902. In the embodiment shown in FIG. 9, the side shield 304B extends close to the ABS. The slabs 902 provide a more gradual path for the magnetic flux to be diverted and reduce the density of the stray magnetic field at every slab 902. Additionally, by extending to the ABS, the magnetic load on the wrap around shield is reduced so that the efficiency of the shielding at the ABS is improved.

The magnetic shield protects the main pole of the PMR write head. The magnetic shield at the backgap/Yoke provides a low reluctance path for the stray magnetic field so that the stray field travels through the shield and is not funneled into the main pole. The shield provides an alternate path for the stray magnetic field density to decrease prior to teaching the disk. If the stray magnetic field is large, then some of the stray magnetic field may diffuse to the return pole. As a whole, the magnetic shield is designed to protect the write head from stray magnetic fields in both parallel and perpendicular directions to the ABS. The magnetic shield at the magnetic backgap allows the write head for the PMR to improve the magnetic backgap coupling for the return flux to the main pole.

It should be understood that while four separate back end shield pieces have been shown and four side shield pieces have been shown, the back end shield pieces and the side shield pieces may be used in any combination. Additionally, shields are formed of magnetically permeable material (such as Ni, Co and Fe alloys) and nonmagnetic layer that is between the shields and the yoke/return pole is formed of nonmagnetic material (such as Ta, TaO, Ru, Rh, NiCr, SiC or $Al_2O_3$).

By providing a magnetic shield surrounding the return pole and yoke, yet spaced from the return pole and yoke by nonmagnetic material, the main pole can be isolated from stray magnetic fields and thus, operate properly.

While the foregoing is directed to embodiments of the present invention, other and further embodiments of the invention may be devised without departing from the basic scope thereof, and the scope thereof is determined by the claims that follow.

What is claimed is:

1. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material, and wherein the shield comprises a side shield and a head cap and wherein the side shield and the head cap are spaced apart by a distance that is less than a thickness of the second nonmagnetic material.

2. The write head of claim 1, wherein the side shield comprises a plurality of slabs spaced apart by nonmagnetic material.

3. The write head of claim 2, wherein the head cap has a substantially rectangular shape.

4. The write head of claim 2, wherein the head cap comprises a plurality of slabs spaced apart by nonmagnetic material.

5. The write head of claim 2, wherein the head cap has a concave face.

6. The write head of claim 1, wherein the head cap comprises a plurality of slabs spaced apart by nonmagnetic material.

7. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material, wherein the shield comprises a side shield and a head cap and wherein the side shield and the head cap are spaced apart by a distance that is less than a thickness of the second nonmagnetic material, and wherein the side shield comprises a plurality of pieces and at least one piece of the plurality of pieces has a flare portion.

8. The write head of claim 7, wherein the head cap has a substantially rectangular shape.

9. The write head of claim 7, wherein the head cap comprises a plurality of slabs spaced apart by nonmagnetic material.

10. The write head of claim 7, wherein the head cap has a concave face.

11. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material, wherein the shield comprises a side shield and a head cap and wherein the side shield and the head cap are spaced apart by a distance that is less than a thickness of the second nonmagnetic material, and wherein the side shield overlaps the head cap.

12. The write head of claim 11, wherein the head cap has a substantially rectangular shape.

13. The write head of claim 11, wherein the head cap comprises a plurality of slabs spaced apart by nonmagnetic material.

14. The write head of claim 11, wherein the head cap has a concave face.

15. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material, wherein the shield comprises a side shield and a head cap and wherein the side shield and the head cap are spaced apart by a distance that is less than a thickness of the second nonmagnetic material, and wherein the head cap has a substantially rectangular shape.

16. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material, wherein the shield comprises a side shield and a head cap and wherein the side shield and the head cap are spaced apart by a distance that is less than a thickness of the second nonmagnetic material, and wherein the head cap has a concave face.

17. A write head for a perpendicular magnetic recording head, comprising:
    a return pole comprising a magnetic material;
    a nonmagnetic material disposed on the return pole; and
    a shield disposed on the nonmagnetic material and at least partially surrounding the return pole, wherein the shield comprises magnetic material and wherein the shield and the return pole comprise the same magnetic material.

18. A write head for a magnetic recording head, comprising:
    a main pole comprising a magnetic material;
    a first nonmagnetic material at least partially surrounding the main pole;
    a coil disposed in the first nonmagnetic material;

a return pole disposed at least partially around the first nonmagnetic material;

a second nonmagnetic material at least partially surrounding the return pole; and a shield at least partially surrounding the second magnetic material, wherein the shield comprises magnetic material, and wherein the shield comprises a side shield and a head cap and wherein the side shield and the head cap are spaced apart by a distance that is less than a thickness of the second nonmagnetic material.

19. The write head of claim 18, wherein the head cap is selected from the group consisting of:

a rectangularly shaped piece;

a piece having a concave face; and a plurality of slabs spaced apart by nonmagnetic material.

20. The write head of claim 19, wherein the side shield is selected from the group consisting of:

a single piece of magnetic material;

multiple, overlapping pieces of magnetic material;

a piece of magnetic material that has a flared portion; and a plurality of slabs spaced apart by nonmagnetic material.

21. A write head for a magnetic recording head, comprising:

a main pole comprising a magnetic material, the main pole having a first end that comprises at least a portion of an air bearing surface;

a nonmagnetic material coupled to the main pole at a second end of the main pole that is opposite the first end;

a shield coupled to the nonmagnetic material such that the nonmagnetic material is disposed between the shield and the main pole; and a head cap, wherein the head cap is selected from the group consisting of:

a rectangularly shaped piece;

a piece having a concave face; and a plurality of slabs spaced apart by nonmagnetic material.

22. The write head of claim 21 further comprising a side shield, wherein the side shield is selected from the group consisting of:

a single piece of magnetic material;

multiple, overlapping pieces of magnetic material;

a piece of magnetic material that has a flared portion; and a plurality of slabs spaced apart by nonmagnetic material.

* * * * *